United States Patent
Lin et al.

(10) Patent No.: US 9,630,271 B1
(45) Date of Patent: Apr. 25, 2017

(54) WELDING GUN WITH EVENLY DISTRIBUTED GAS PRESSURE

(71) Applicants: Yung-Sheng Lin, Taichung (TW); Shui-Chi Kuo, Taichung (TW)

(72) Inventors: Yung-Sheng Lin, Taichung (TW); Shui-Chi Kuo, Taichung (TW)

( * ) Notice: Subject to any disclaimer, the term of this patent is extended or adjusted under 35 U.S.C. 154(b) by 0 days.

(21) Appl. No.: 15/057,181

(22) Filed: Mar. 1, 2016

(51) Int. Cl.
  *B23K 9/12* (2006.01)
  *B23K 9/29* (2006.01)
  *B23K 9/173* (2006.01)

(52) U.S. Cl.
  CPC .............. *B23K 9/295* (2013.01); *B23K 9/173* (2013.01)

(58) Field of Classification Search
  CPC ................................ B23K 9/295; B23K 9/173
  USPC ............ 219/137.52, 137.44, 137.62, 137.63, 219/137.42
  See application file for complete search history.

(56) References Cited

U.S. PATENT DOCUMENTS

| | | | | |
|---|---|---|---|---|
| 3,536,888 A | * | 10/1970 | Borneman | B23K 9/291 219/136 |
| 4,158,763 A | * | 6/1979 | Moerke | B23K 9/295 219/137.42 |

* cited by examiner

*Primary Examiner* — Phuong Nguyen
(74) *Attorney, Agent, or Firm* — Alan D. Kamrath; Kamrath IP Lawfirm, P.A.

(57) ABSTRACT

A welding gun includes a bending pipe (10), an insulating barrel (20) mounted on a mounting seat (11) of the bending pipe, a nozzle (30) mounted on the mounting seat (11) of the bending pipe, a connector (40) connected with the insulating barrel, and a cap (50) connected with the connector. The mounting seat has a groove (14) which has a periphery provided with a plurality of flow channels (15). The insulating barrel has an interior provided with an air chamber (23) connected to the flow channels. The air chamber includes a plane (85) and a guiding wall (86) to evenly stabilize a pressure of a welding gas. The insulating barrel has a mediate portion provided with a recessed end face (24) which is provided with a plurality of guiding holes (25) connected to the air chamber.

3 Claims, 7 Drawing Sheets

WELDING GUN WITH EVENLY DISTRIBUTED GAS PRESSURE

BACKGROUND OF THE INVENTION

1. Field of the Invention

The present invention relates to a tool and, more particularly, to a welding gun.

2. Description of the Related Art

Figure 1:
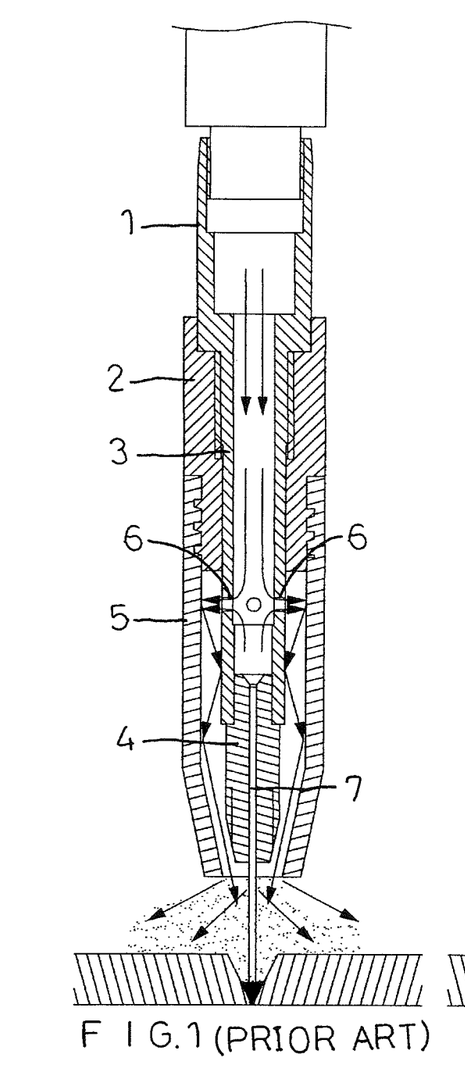
FIG. 1 is a cross-sectional operational view of a conventional welding gun in accordance with the prior art.
Figure 2:
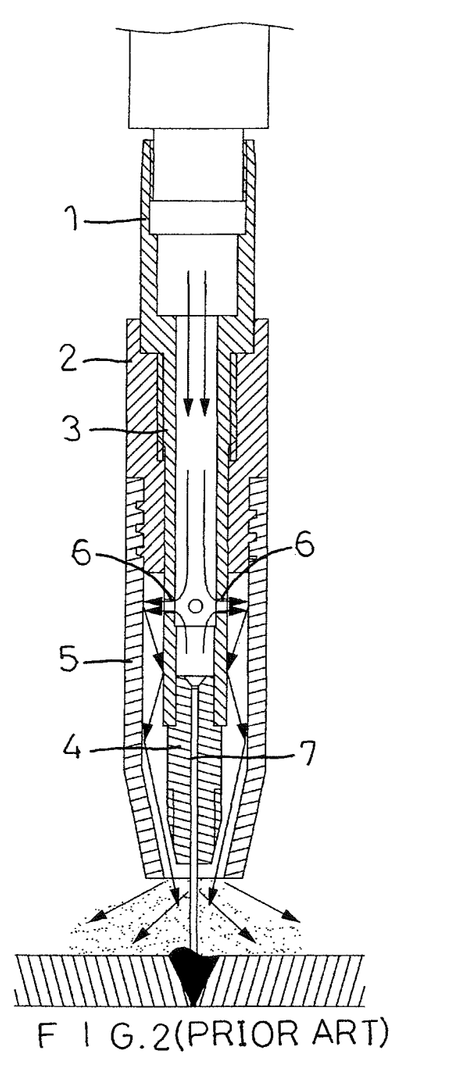
FIG. 2 is another cross-sectional operational view of the conventional welding gun in accordance with the prior art.
Figure 3:
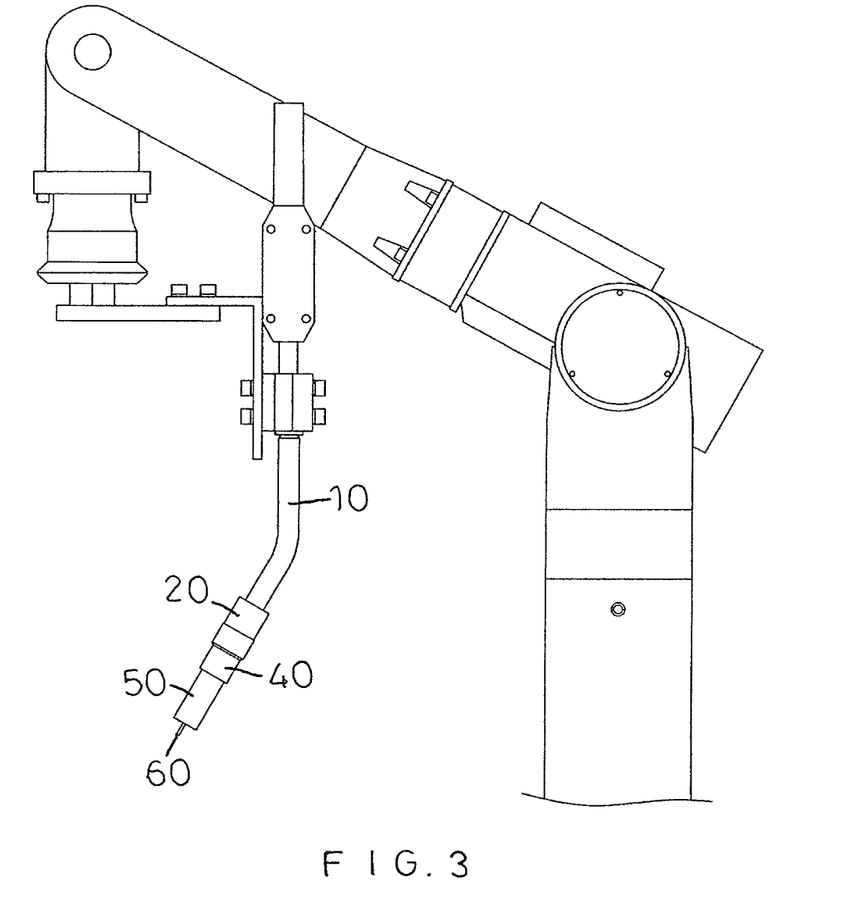
FIG. 3 is a schematic view of showing usage of a welding gun in accordance with the preferred embodiment of the present invention.
Figure 4:
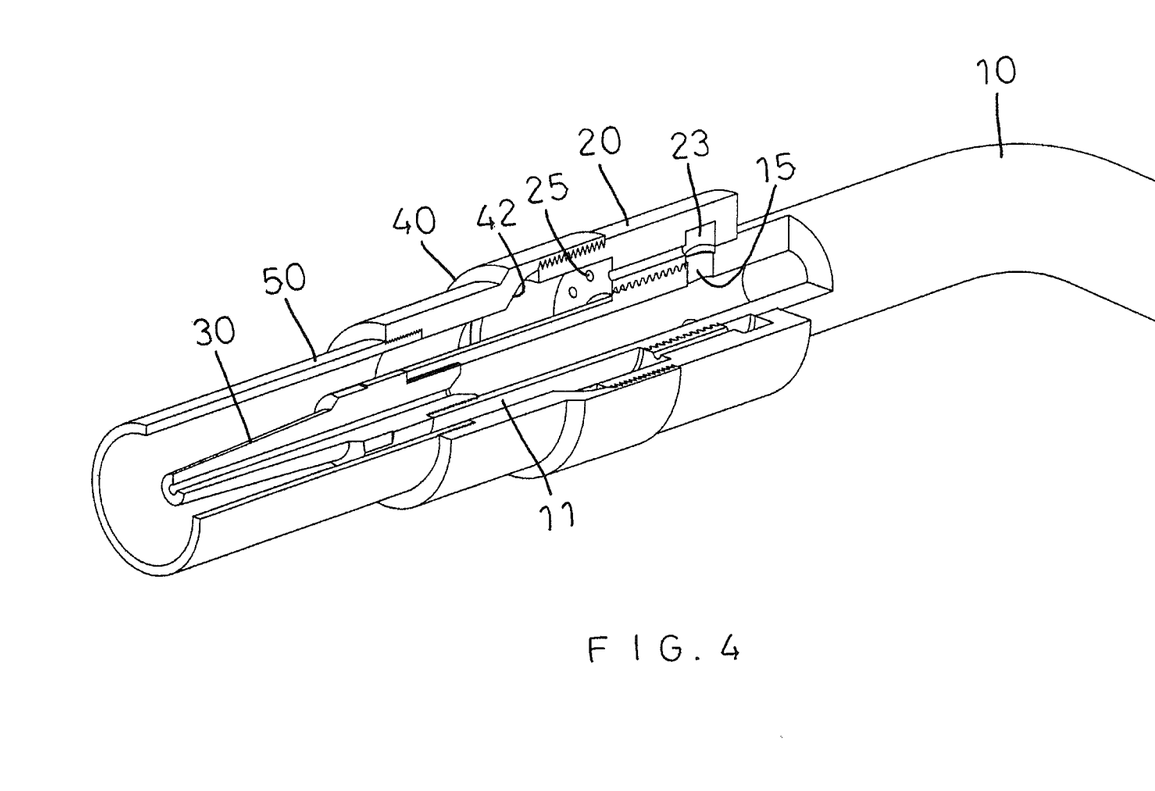
FIG. 4 is a perspective cross-sectional assembly view of the welding gun in accordance with the preferred embodiment of the present invention.
Figure 5:
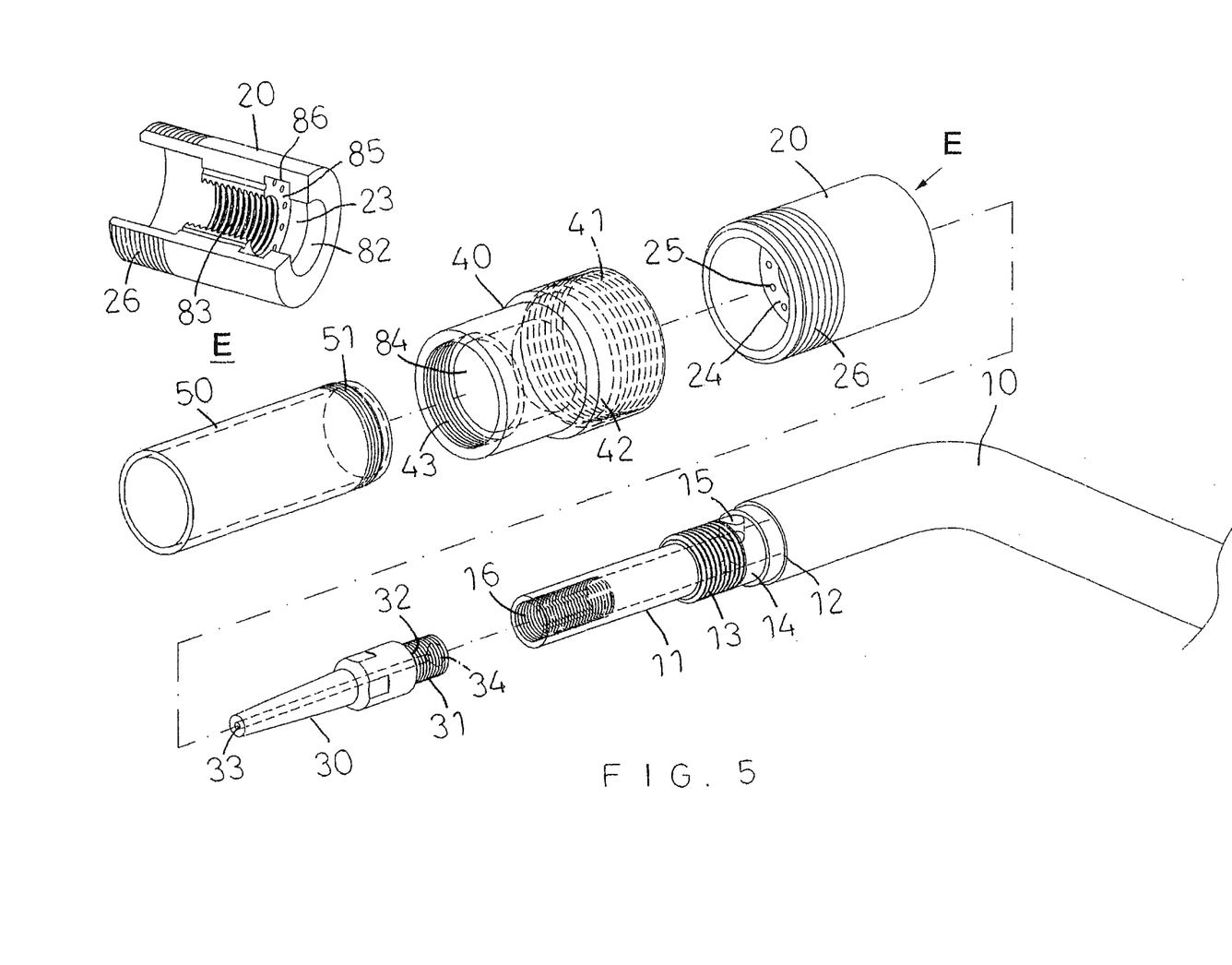
FIG. 5 includes an exploded perspective view of the welding gun in accordance with the present invention, and a cross-sectional view of a mark "E".
Figures 6, 7:
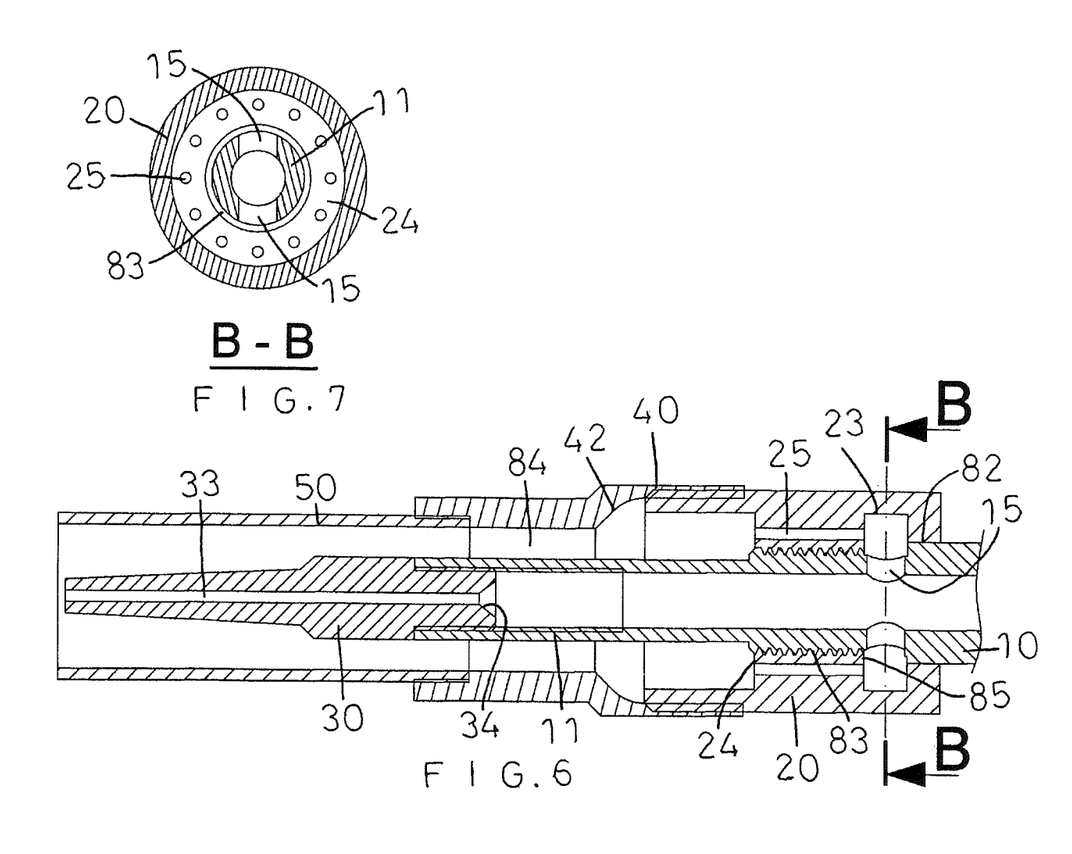
FIG. 6 is a cross-sectional assembly view of the welding gun as shown in FIG. 5.
FIG. 7 is a cross-sectional view of the welding gun taken along a line B-B as shown in FIG. 6.

A conventional welding gun in accordance with the prior art shown in FIGS. 1 and 2 comprises an air inlet connector 1, a connecting member 2 connected with the air inlet connector 1, an air inlet pipe 3 extending from the air inlet connector 1 and extending through the connecting member 2 to allow introduction of a welding gas (such as carbon dioxide), a chuck 4 connected with the air inlet pipe 3 to allow insertion of an electrode 7, and an outer pipe 5 mounted on and located outside of the connecting member 2. A gap is defined between the outer pipe 5 and the air inlet pipe 3. The air inlet pipe 3 has a periphery provided with a plurality of vent holes 6. When in use, the welding gas flows through the air inlet connector 1, the air inlet pipe 3, the vent holes 6 of the air inlet pipe 3 and the gap between the outer pipe 5 and the air inlet pipe 3 and is injected outward from the outer pipe 5. However, when the welding gas flows through the vent holes 6 of the air inlet pipe 3 into the gap between the outer pipe 5 and the air inlet pipe 3, the welding gas is injected transversely to hit the inner wall of the outer pipe 5, thereby forming a turbulent flow, so that the pressure of the welding gas is unsteady and not evenly distributed, thereby causing an unsafe welding operation. In addition, the welding gas is unsteady and not evenly distributed so that the welding spot is not formed completely, thereby decreasing the aesthetic quality of the welding spot. Further, when the welding gas is unsteady, the electrode 7 and the welding gas are consumed and wasted. Further, the welding dregs produced during the welding process easily enter the outer pipe 5 to cause a choke so that the welding gas does not flow smoothly.

BRIEF SUMMARY OF THE INVENTION

The primary objective of the present invention is to provide a welding gun that stabilizes and evenly distributes the pressure of the welding gas.

In accordance with the present invention, there is provided a welding gun comprising a bending pipe, an insulating barrel mounted on the bending pipe, a nozzle mounted on the bending pipe, a connector connected with the insulating barrel, and a cap connected with the connector. The bending pipe has an end provided with a mounting seat. A liner tube is mounted in the mounting seat. A spring is mounted on the liner tube. The mounting seat has an exterior provided with an stepped edge, a groove and an external thread. The groove of the mounting seat is defined between the stepped edge and the external thread and has a periphery provided with a plurality of flow channels. The mounting seat has an interior provided with an internal thread. The insulating barrel has an interior provided with a mounting hole, an air chamber and an internal thread. The air chamber of the insulating barrel is connected to the flow channels of the mounting seat. The mounting hole of the insulating barrel is mounted on the stepped edge of the mounting seat to allow a welding gas to flow through the flow channels of the mounting seat into the air chamber of the insulating barrel. The air chamber of the insulating barrel includes a plane and a guiding wall to evenly stabilize a pressure of the welding gas. The internal thread of the insulating barrel is screwed onto the external thread of the mounting seat. The insulating barrel has a mediate portion provided with a recessed end face which is provided with a plurality of guiding holes to evenly distribute the welding gas. The guiding holes of the insulating barrel are connected to the air chamber and correspond to the plane of the air chamber. The insulating barrel has an exterior provided with an external thread. The nozzle has an exterior provided with an external thread screwed into the internal thread of the mounting seat. The nozzle has an interior provided with an outlet port to allow insertion of an electrode. The connector has a first end provided with a first inner thread screwed onto the external thread of the insulating barrel and a second end provided with a second inner thread. The connector has an interior provided with a conical guide face and a restriction flow channel. The guide face of the connector corresponds to the guiding holes of the insulating barrel to guide and direct the welding gas toward a central position of the connector. The restriction flow channel of the connector restricts the welding gas in the cap. The cap has an end provided with an outer thread screwed into the second inner thread of the connector. The cap covers the mounting seat and the nozzle.

According to the primary advantage of the present invention, the pressure of the welding gas is stabilized and evenly distributed by the guiding wall of the insulating barrel so that the welding operation is performed safely, and the aesthetic quality of the welding spot is enhanced.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 3-7, a welding gun in accordance with the preferred embodiment of the present invention comprises a bending pipe 10, an insulating barrel 20 mounted on the bending pipe 10, a nozzle 30 mounted on the bending pipe 10, a connector 40 connected with the insulating barrel 20, and a cap 50 connected with the connector 40.

The bending pipe 10 has an end provided with a mounting seat 11. A liner tube 88 (see FIG. 8) is mounted in the mounting seat 11. Preferably, the liner tube 88 is made of rubber or plastic material. A spring "S" (see FIG. 8) is mounted on the liner tube 88 and disposed in the mounting seat 11. The spring "S" has an outer diameter slightly smaller than an inner diameter of the mounting seat 11. The mounting seat 11 has an exterior provided with an stepped edge 12, a groove 14 and an external thread 13. The groove 14 of the mounting seat 11 is defined between the stepped edge 12 and the external thread 13 and has a periphery provided with a plurality of flow channels 15 which extend radially. The mounting seat 11 has an interior provided with an internal thread 16. The flow channels 15 of the mounting seat 11 are connected to the interior of the mounting seat 11.

The insulating barrel 20 is preferably made of insulation material, such as plastic material. The insulating barrel 20 is mounted on the mounting seat 11 of the bending pipe 10 and has an interior provided with a mounting hole 82, an air chamber 23 and an internal thread 83. The air chamber 23 of the insulating barrel 20 is defined between the mounting hole 82 and the internal thread 83 and connected to the flow channels 15 of the mounting seat 11. The mounting hole 82 of the insulating barrel 20 is mounted on the stepped edge 12 of the mounting seat 11 to form a closed state between the mounting hole 82 of the insulating barrel 20 and the stepped edge 12 of the mounting seat 11 to allow a welding gas to flow through the flow channels 15 of the mounting seat 11 into the air chamber 23 of the insulating barrel 20. The air chamber 23 of the insulating barrel 20 includes a plane 85 and a guiding wall 86 to evenly stabilize a pressure of the welding gas in the air chamber 23 of the insulating barrel 20. The internal thread 83 of the insulating barrel 20 is screwed onto the external thread 13 of the mounting seat 11. The insulating barrel 20 has a mediate portion provided with a recessed end face 24 which is provided with a plurality of guiding holes 25 to evenly distribute the welding gas. The guiding holes 25 of the insulating barrel 20 are connected to the air chamber 23 and correspond to the plane 85 of the air chamber 23. The insulating barrel 20 has an exterior provided with an external thread 26.

The nozzle 30 has an exterior provided with an external thread 31 screwed into the internal thread 16 of the mounting seat 11. The nozzle 30 has a mediate portion provided with an outer rim 32 abutting the mounting seat 11. The nozzle 30 has an interior provided with an outlet port 33 to allow insertion of an electrode 60. The outlet port 33 of the nozzle 30 has an end provided with a conical hole 34 connected to the interior of the mounting seat 11.

The connector 40 has a first end provided with a first inner thread 41 screwed onto the external thread 26 of the insulating barrel 20 and a second end provided with a second inner thread 43. The connector 40 has an interior provided with a conical guide face 42 and a restriction flow channel 84. The guide face 42 of the connector 40 corresponds to the guiding holes 25 of the insulating barrel 20 to guide and direct the welding gas toward a central position of the connector 40. The guide face 42 of the connector 40 is disposed between the restriction flow channel 84 and the guiding holes 25 of the insulating barrel 20. The restriction flow channel 84 of the connector 40 restricts the welding gas in the cap 50.

The cap 50 has an end provided with an outer thread 51 screwed into the second inner thread 43 of the connector 40. The cap 50 covers the mounting seat 11 and the nozzle 30.

Figure 8:
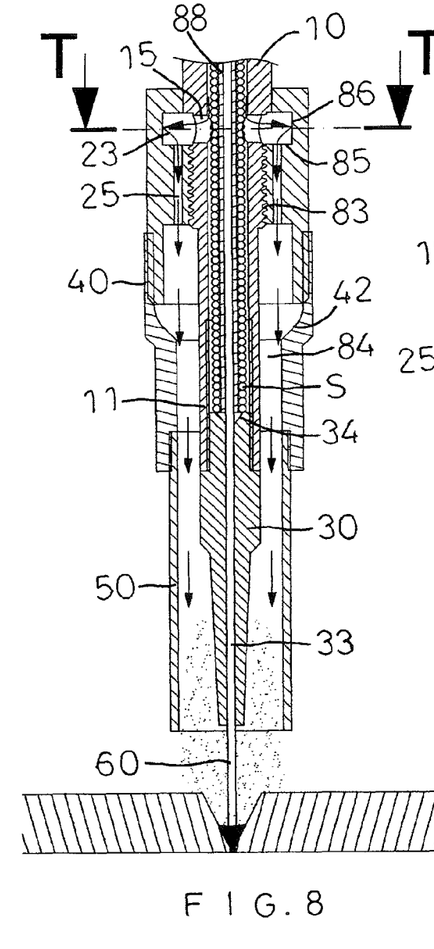
FIG. 8 is a cross-sectional operational view of the welding gun in accordance with the preferred embodiment of the present invention.
Figure 9:
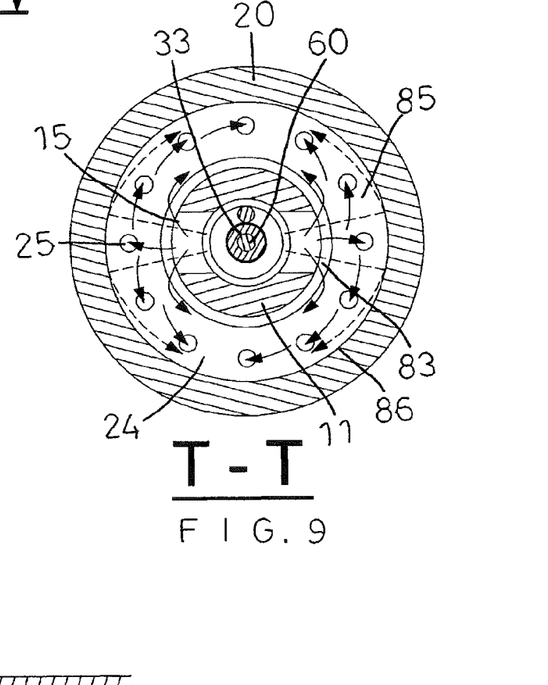
FIG. 9 is a cross-sectional view of the welding gun taken along a line T-T as shown in FIG. 8.
Figure 10:
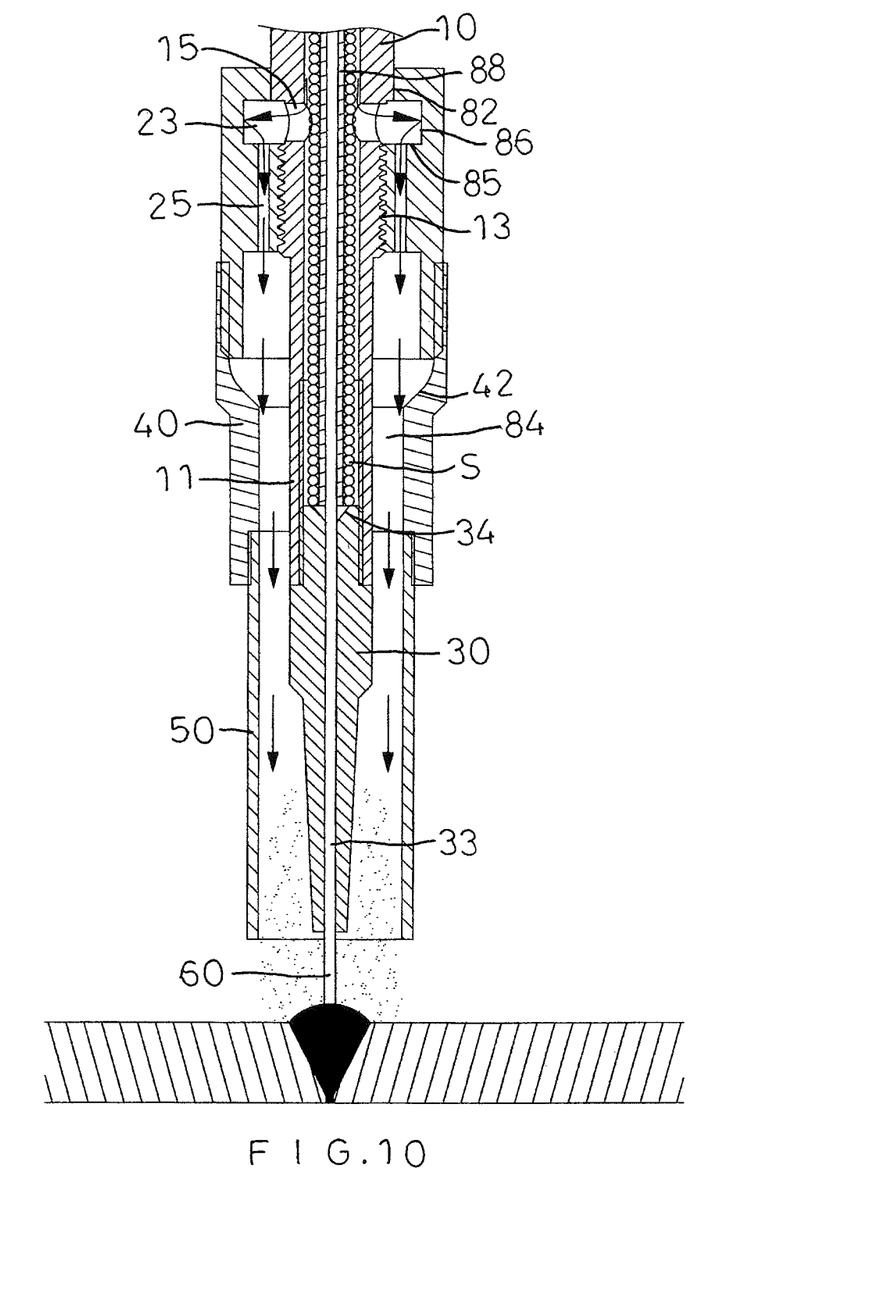
FIG. 10 is a cross-sectional view showing finish of a welding operation of the welding gun in accordance with the preferred embodiment of the present invention.

In operation, referring to FIGS. 8-10 with reference to FIGS. 3-7, the welding gas initially flows from the bending pipe 10 into the mounting seat 11. Then, the welding gas in the mounting seat 11 flows through the flow channels 15 of the mounting seat 11 into the air chamber 23 of the insulating barrel 20. At this time, the guiding wall 86 of the insulating barrel 20 stabilizes and evenly distributes the pressure of the welding gas in the air chamber 23 of the insulating barrel 20. Then, the welding gas flows through the guiding holes 25 of the insulating barrel 20 into the connector 40. At this time, the guide face 42 of the connector 40 corresponds to the guiding holes 25 of the insulating barrel 20 to guide and direct the welding gas toward the central position of the connector 40, while the restriction flow channel 84 of the connector 40 restricts the welding gas in the cap 50. Finally, the welding gas flows into the cap 50 and is injected outward from the cap 50. In such a manner, the welding gas covers and protects a welding zone of the electrode 60 to prevent from incurring oxidation and pollution. At the same time, the welding gas stabilizes the welding operation to provide a safe welding process and to enhance the aesthetic quality of the welding spot. In addition, the welding gas is stabilized and regulated to save the energy and the amount of the welding gas.

Accordingly, the pressure of the welding gas is stabilized and evenly distributed by the guiding wall 86 of the insulating barrel 20 so that the welding operation is performed safely, and the aesthetic quality of the welding spot is enhanced.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A welding gun comprising:
   a bending pipe (10);
   an insulating barrel (20) mounted on the bending pipe;
   a nozzle (30) mounted on the bending pipe;
   a connector (40) connected with the insulating barrel; and
   a cap (50) connected with the connector;
   wherein:
   the bending pipe has an end provided with a mounting seat (11);
   a liner tube (88) is mounted in the mounting seat;
   a spring (S) is mounted on the liner tube;
   the mounting seat has an exterior provided with an stepped edge (12), a groove (14) and an external thread (13);
   the groove of the mounting seat is defined between the stepped edge and the external thread and has a periphery provided with a plurality of flow channels (15);
   the mounting seat has an interior provided with an internal thread (16);
   the insulating barrel is disposed outside of and surrounds the mounting seat;
   the insulating barrel has an interior provided with a mounting hole (82), an air chamber (23) and an internal thread (83);
   the air chamber of the insulating barrel is disposed outside of and connected to the flow channels of the mounting seat;

the mounting hole of the insulating barrel is mounted on the stepped edge of the mounting seat to allow a welding gas to flow through the flow channels of the mounting seat into the air chamber of the insulating barrel;

the air chamber of the insulating barrel includes a plane (85) and a guiding wall (86) to evenly stabilize a pressure of the welding gas;

the internal thread of the insulating barrel is screwed onto the external thread of the mounting seat;

the insulating barrel has a mediate portion provided with a recessed end face (24) which is provided with a plurality of guiding holes (25) to evenly distribute the welding gas;

the guiding holes of the insulating barrel are connected to the air chamber and correspond to the plane of the air chamber;

the insulating barrel has an exterior provided with an external thread (26);

the nozzle (30) has an exterior provided with an external thread (31) screwed into the internal thread of the mounting seat;

the nozzle has an interior provided with an outlet port (33) to allow insertion of an electrode (60);

the connector has a first end provided with a first inner thread (41) screwed onto the external thread of the insulating barrel and a second end provided with a second inner thread (43);

the connector has an interior provided with a conical guide face (42) and a restriction flow channel (84);

the guide face of the connector corresponds to the guiding holes of the insulating barrel to guide and direct the welding gas toward a central position of the connector;

the guide face of the connector is arranged between the guiding holes of the insulating barrel and the restriction flow channel;

the restriction flow channel of the connector restricts the welding gas in the cap;

the cap has an end provided with an outer thread (51) screwed into the second inner thread of the connector; and the cap covers the mounting seat and the nozzle.

2. The welding gun of claim 1, wherein the outlet port of the nozzle has an end provided with a conical hole (34) connected to the interior of the mounting seat.

3. The welding gun of claim 1, wherein the insulating barrel is made of insulation material including plastic material.

* * * * *